(12) United States Patent
Polan et al.

(10) Patent No.: US 7,506,021 B2
(45) Date of Patent: Mar. 17, 2009

(54) PROVISIONING WEB SERVICES

(75) Inventors: Michael G. Polan, Markham (CA);
Marika Joannidis, Brampton (CA);
Stephen P. Roberts, Mississauga (CA);
John W. Stephenson, Blackstock (CA);
Gabi Rothenstein, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 911 days.

(21) Appl. No.: 10/666,869

(22) Filed: Sep. 18, 2003

(65) Prior Publication Data

US 2004/0068565 A1 Apr. 8, 2004

(30) Foreign Application Priority Data

Sep. 30, 2002 (CA) .................................. 2405673

(51) Int. Cl.
*G06F 15/16* (2006.01)
*G06F 15/173* (2006.01)
*G06F 15/177* (2006.01)
*G06F 3/00* (2006.01)
*G06F 9/44* (2006.01)
*G06F 9/46* (2006.01)
*G06F 13/00* (2006.01)

(52) U.S. Cl. ...................... 709/201; 709/221; 709/223; 709/225; 709/229; 709/230; 719/328; 719/330

(58) Field of Classification Search .................. 709/201, 709/221, 223, 225, 229, 230; 719/328, 330
See application file for complete search history.

(56) References Cited

U.S. PATENT DOCUMENTS

| | | | | |
|---|---|---|---|---|
| 5,930,777 A | 7/1999 | Barber | ........................ | 705/40 |
| 6,026,365 A | 2/2000 | Hayashi et al. | ................ | 705/9 |
| 6,349,238 B1 | 2/2002 | Gabbita et al. | ............... | 700/101 |
| 6,633,907 B1* | 10/2003 | Spencer et al. | ............... | 709/223 |
| 2002/0194045 A1* | 12/2002 | Shay et al. | ..................... | 705/8 |
| 2003/0036917 A1* | 2/2003 | Hite et al. | ....................... | 705/1 |
| 2003/0041131 A1* | 2/2003 | Westerinen et al. | ......... | 709/221 |
| 2003/0055624 A1* | 3/2003 | Fletcher et al. | ................. | 704/2 |
| 2003/0055878 A1* | 3/2003 | Fletcher et al. | ............. | 709/203 |
| 2003/0061404 A1* | 3/2003 | Atwal et al. | ................. | 709/328 |
| 2003/0084177 A1* | 5/2003 | Mulligan | .................... | 709/230 |

(Continued)

FOREIGN PATENT DOCUMENTS

EP 1009175 9/2000

(Continued)

*Primary Examiner*—Kenny S Lin
*Assistant Examiner*—Angela Widhalm
(74) *Attorney, Agent, or Firm*—Yee & Associates, P.C.; Jeffrey S. LaBaw

(57) ABSTRACT

A web service provisioning system including a subscription system having a web service description data correlated to the at least one web service, and provisioning processes data correlated to the at least one web service. The provisioning system also includes an invocation system operatively coupled to the subscription system. A method of provisioning at least one web service, the method including the steps of providing user profile data; providing web service description data correlated to the at least one web service; providing provisioning processes data correlated to the at least one web service; selecting at least one web service; and invoking the provisioning processes data correlated to the selected at least one web service.

6 Claims, 5 Drawing Sheets

U.S. PATENT DOCUMENTS

| | | | |
|---|---|---|---|
| 2003/0105864 A1* | 6/2003 | Mulligan et al. | 709/225 |
| 2003/0120502 A1* | 6/2003 | Robb et al. | 705/1 |
| 2003/0135628 A1* | 7/2003 | Fletcher et al. | 709/229 |
| 2003/0163513 A1* | 8/2003 | Schaeck et al. | 709/201 |
| 2003/0210657 A1* | 11/2003 | Mahajan | 370/310 |
| 2004/0034540 A1* | 2/2004 | Chen et al. | 705/1 |

FOREIGN PATENT DOCUMENTS

| | | |
|---|---|---|
| JP | 2000358282 | 12/2000 |
| WO | WO 9933228 | 7/1999 |
| WO | WO0180083 | 10/2001 |

* cited by examiner

PROVISIONING WEB SERVICES

FIELD OF THE INVENTION

This invention relates to the field of web services, and in particular to the provisioning of web services.

BACKGROUND

Web services are computer operations or functions that can be invoked remotely using an Internet based protocol over the web.

Communication between the client and server takes place over the Internet using standard Internet protocols. Simple Object Access Protocol (SOAP) over Hypertext Transfer Protocol (HTTP) is commonly used. A web service can be invoked from any machine that has Internet access, and the services themselves can be hosted in any data center that provides HTTP access.

As well, web services are currently defined using the Web Services Definition Language (WSDL). WSDL is a meta-description of web services. In addition to being readable by a human user, WSDL is easily read and processed by computer applications. This enables better web service client and server composition tools, as well as dynamic discovering, binding and use classes of applications.

Web services exchange data through the use of text based XML documents. These documents may be specified in a fashion that is computer language and computer platform neutral. As a result, web services may be invoked from any client to any server without requiring the client and server to utilize the same language or operating system.

Web Services Flow Language (WSFL) is a standard that supports the composition of web services into business process models. It does this by capturing the orchestration and choreography of a given composition of services.

Many computer applications exist for the modeling of business processes. These applications enable the creation of the models to automate the business process. The modeled processes are called workflows. The component of an application, which performs the process automation, is called a workflow engine.

Certain web services, particularly those for which fees and financial accounts are involved typically require significant provisioning or preparation of associated resources.

Accordingly, the inventors have recognized the need to provide systems and methods for provisioning web services.

SUMMARY OF THE INVENTION

An aspect of the present invention is directed towards a web service provisioning system for provisioning at least one web service.

The provisioning system includes a subscription system having web service description data correlated to the at least one web service, and provisioning processes data correlated to the at least one web service. The provisioning system also includes an invocation system operatively coupled to the subscription system.

The provisioning system may also include a service catalog system configured to select at least one web service. The service catalog system may also be configured to determine user profile data. Preferably, the invocation system includes a workflow execution engine configured to receive user profile data and provisioning processes data, and configured to invoke provisioning processes data.

Another aspect of the present invention is directed towards a method of provisioning at least one web service, the method comprising the following steps:
 a. providing user profile data;
 b. providing web service description data correlated to the at least one web service;
 c. providing web service provisioning processes data correlated to the at least one web service;
 d. selecting at least one web service;
 e. invoking the web service provisioning processes data correlated to the selected at least one web service.

BRIEF DESCRIPTION OF THE DRAWINGS

Embodiments of the present invention will now be described, by way of example only, With reference to the following drawings, in which like reference numerals refer to like parts and In which.

DETAILED DESCRIPTION OF THE INVENTION

Figure 1:
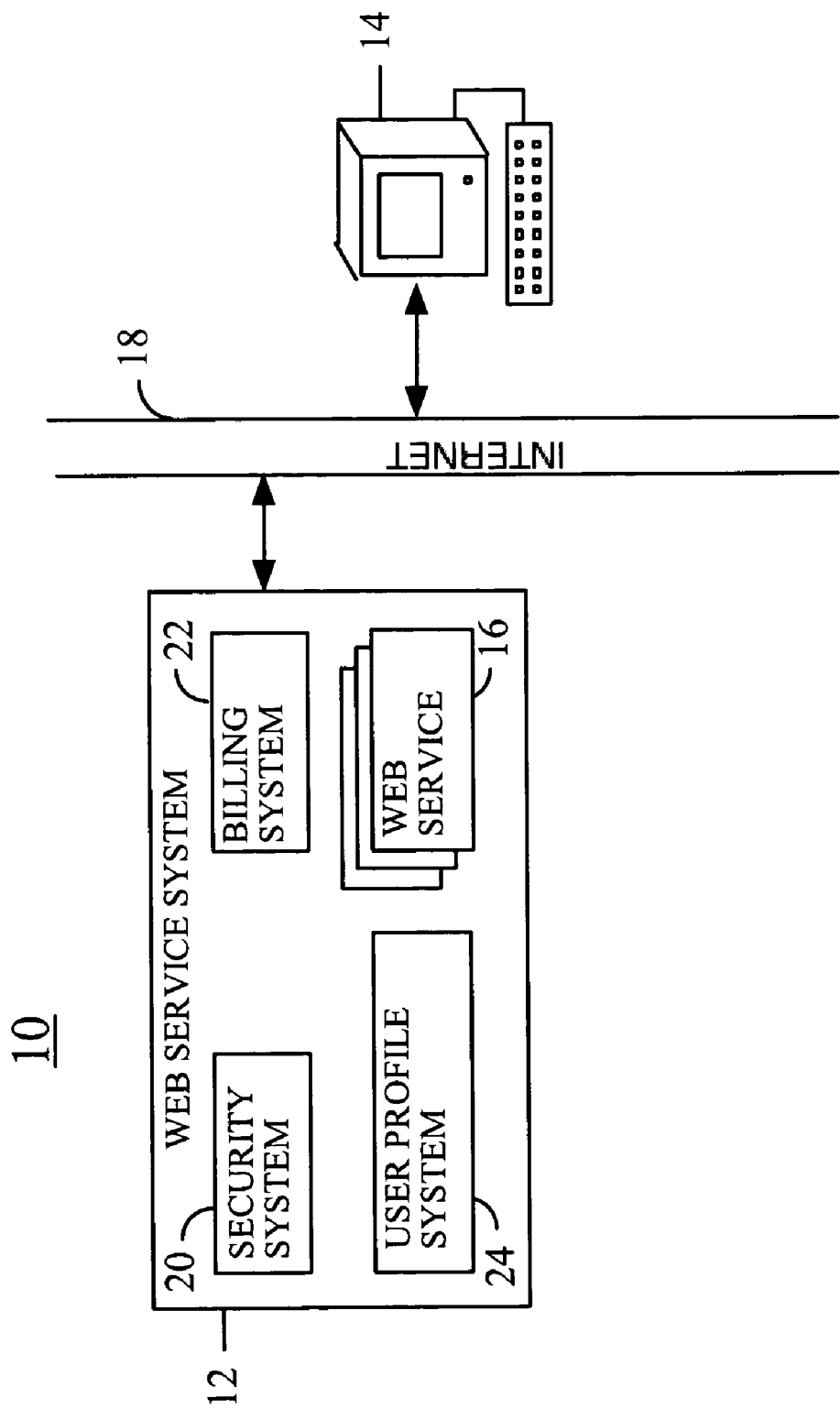
FIG. 1 is a schematic diagram of the components of a web services system which must be provisioned in order to give a consumer access to a web service.

The procedure used to complete a task within a business is called a business process. Consider the process followed when a request to purchase a stock is performed over the phone. The customer representative (CR) first verifies the identity of the caller who is requesting the purchase, and finds the customer account. Next the CR forwards the request to the trader to make the purchase. Once completed, a confirmation of the purchase must be provided back to the customer, and the customer's account debited for the cost of the transaction. There maybe an approval step involved, for example if the purchase was for a significant number of shares, or for an amount that exceeded the customer's current account balance.

A business process can be represented with a process description language. If the steps of the process can be automated, a program that can interpret the process description language may be used to manage the process from start to completion. A description that represents a business process is often referred to as a workflow.

Consider the process to purchase stocks on behalf of a customer described above. Each of the steps of that process could be implemented as a web service that can be invoked remotely via the Internet. Such a complex process could be described as a composition of web services. As will be understood by one skilled in the art, the Web Services Flow Language (WSFL) can be used to represent compositions of web services.

A simple web service could be developed to determine a stock quote: getStockQuote(String symbol);

A service of this type is a remote procedure call (RPC) that would be invoked by a client application. As will be understood, the stock "symbol" is a parameter which is required to invoke the procedure call. A typical implementation of this web service would be the conversion of the request into a proprietary call over a local connection to retrieve the current stock price from an application which keeps track of stock prices. The result would be converted back to SOAP format and returned to the client application.

Such a web service can be invoked without requiring information about the identity of the caller. As noted, the only required parameter is the stock symbol. Many organizations offer this type of web service free of charge.

Consider now the implementation of a web service that is used to purchase a stock. This call might appear as:

purchaseStock(String symbol, String accountID, Int numberOfShares);

In this example, the required parameters include the referenced account ("accountID"). The account must be known to the system providing the web service beforehand, in order to verify the account information and to assign the ownership of the purchased stocks appropriately. Typically, a commission would be charged against the account (often based on the value of the stock purchased), in addition to a fixed charge for using the web service.

Accordingly, before a customer can use the purchaseStock web service, an account must be established for that customer, and other information such as the customer's name and address must be provided. The data center network infrastructure must be configured to route the web service requests and responses appropriately. These steps are a business process. Configuring a system with account and other information sufficient to allow a particular consumer to access a particular web service is referred to as "provisioning".

FIG. 1 illustrates a typical commercial web service system, shown generally as 10, and components 12 that may need to be provisioned in order to give a consumer 14 access to a web service 16 (such as the purchaseStock web service discussed above) over the Internet 18.

The components 12 of the web service system 10 may include a Security System 20 or module, which will need to be provided with a user identity and/or password in order to authenticate the consumer 14 when using the web service 16. The Security System 20 will also often require a list of the system 10 resources to which the consumer 14 will need access to use the web service 16. A Billing System 22 or module may also be required in order to charge the consumer 14 for the use of the web service 16. Accordingly, the Billing System will need to be provisioned with a billing account for that consumer 14. A User Profile System 24 or module is also common. Typically, the User Profile System 24 will be provisioned with and record personal information or user profile data about the consumer, such as the consumer's name, address and phone number. While not shown, other components will often require provisioning for elaborate commercial web services.

As will be understood, the steps in the provisioning process for the web service system 10 would typically include: configuring the Security System 20 with the consumer's 14 identity and/or password; creating an account for the consumer 14 in the Billing System 22; storing the consumer's 14 user profile data in the User Profile System 24; and informing the component providing the web service 16 that the consumer 14 is ready to access the web service 16.

Figure 2:
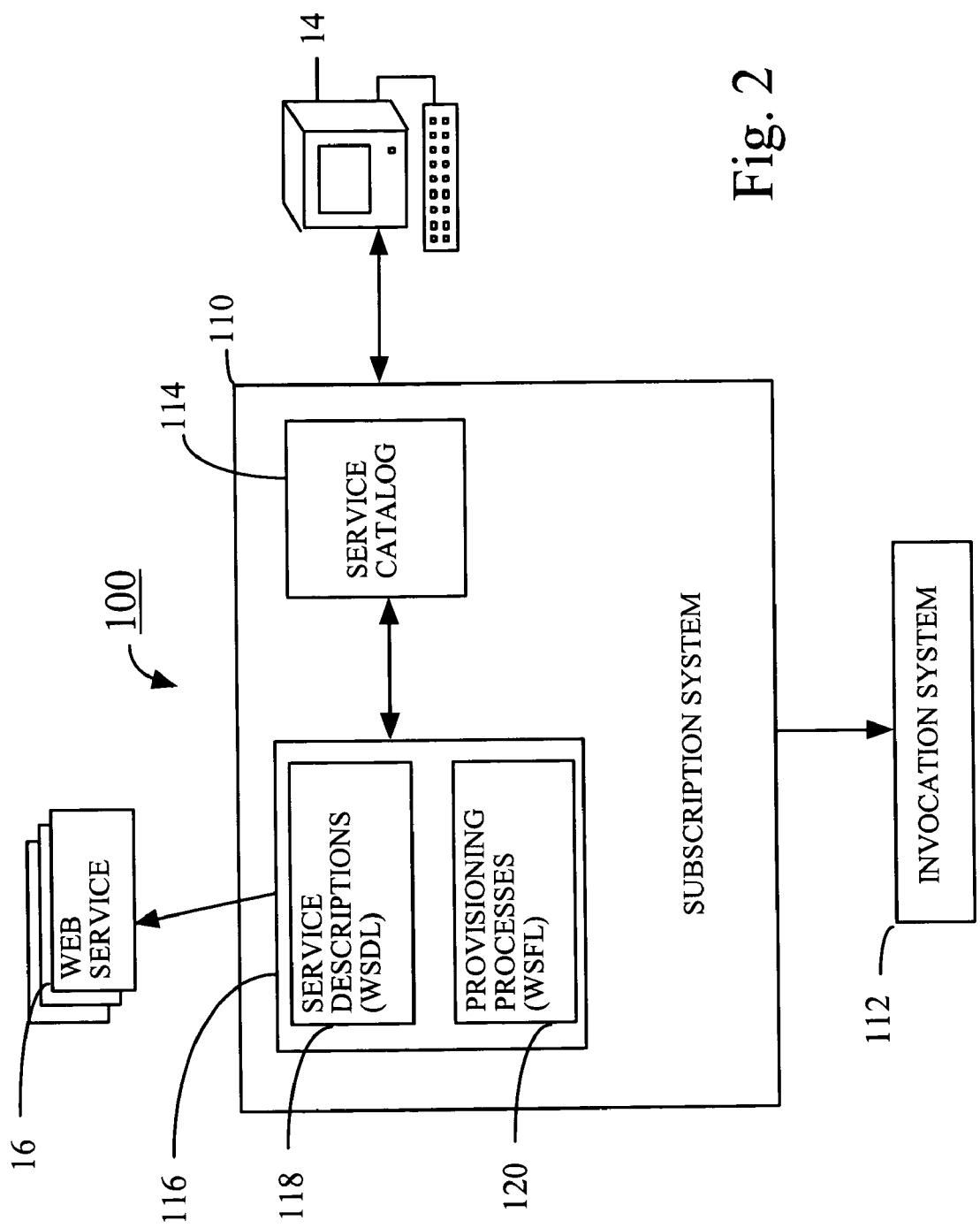
FIG. 2 is a schematic diagram of a web provisioning system, made in accordance with the present invention.

FIG. 2 illustrates a WSFL-based web service provisioning system, shown generally as 100, made in accordance with the present invention. The provisioning system 100 includes a subscription system 110 and an invocation system 112.

The subscription system 110 includes a service catalog system or module 114, as well as a web service provisioning database 116. The provisioning database 116 contains web service description data 118 (ie. a WSDL description correlated to each web service 16), and WSFL provisioning process (or workflow) data 120 corresponding to the web service steps required for provisioning each web service 16. The service catalog module 114 is configured to present to the user 14 each of the available web services (including web service 16), as well as the correlated WSDL description for each available web service. Through the service catalog module 114, the user 14 may then select one or more desired web services 16.

The service catalog module 114 is also configured to determine and store user profile data 122 (shown on FIG. 3) corresponding to the user 14, typically by requiring the user 14 to input the required data.

Once the user has selected a web service 16, the service catalog module 110 passes the WSFL provisioning process data 120 correlated to the web service 16, as well as the user profile data 122, to the invocation system 112. Typically, the WSFL provisioning process data 120 and the user profile data 122 are stored and transferred as text based XML documents.

Figure 3:
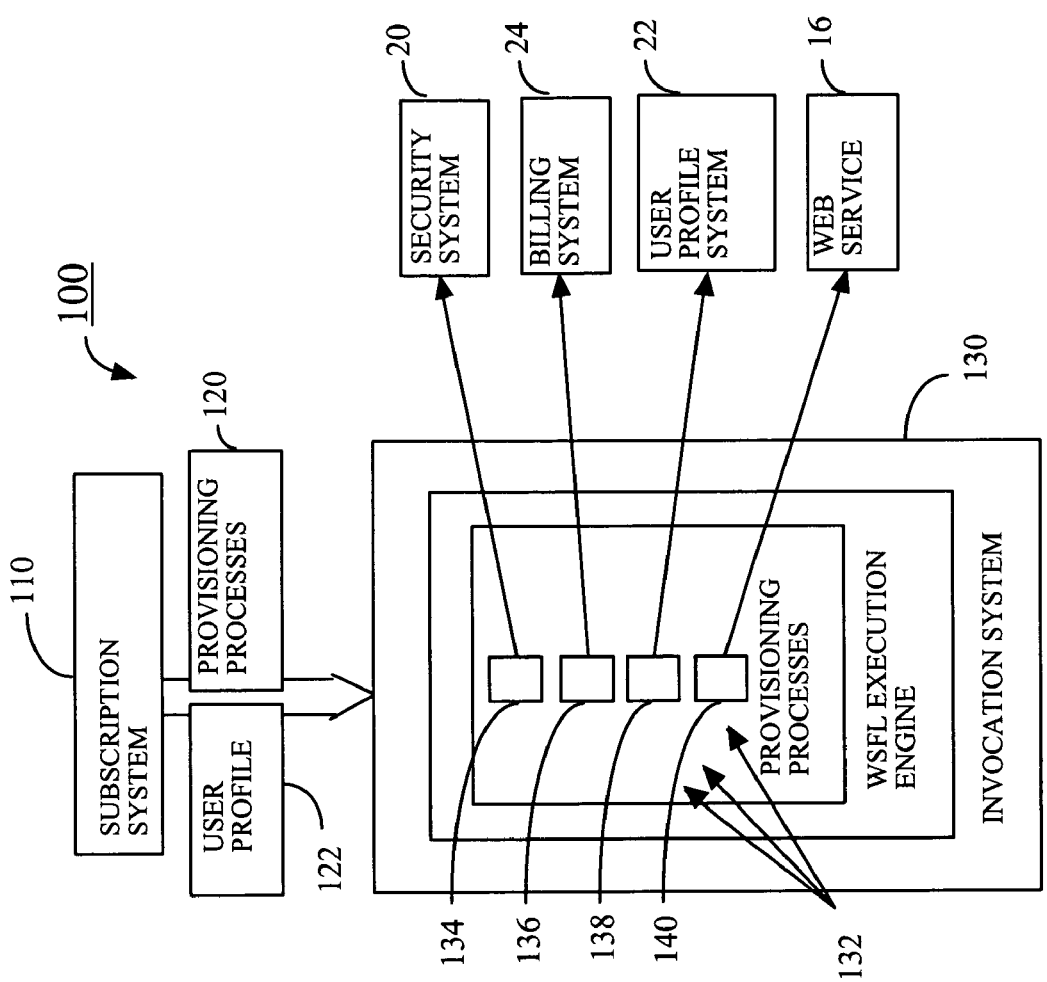
FIG. 3 is a schematic diagram of the invocation system portion of the web provisioning system of FIG. 2.

FIG. 3 illustrates in greater detail the basic components of the invocation system 112, and its relationship to the components 20 to be provisioned. The invocation system 112 includes a WSFL execution engine 130, which is provided with the WSFL provisioning process data 120 and the user profile data 122.

As illustrated in FIG. 3, each of the steps in the provisioning process exists as a node 132 in the WSFL provisioning process data 120. Each node 132 contains web service invocation data for invoking a particular provisioning web service created to implement one step of the provisioning process.

By way of example only, the following illustrates a simple provisioning workflow. The first node 134 may be designed to invoke a web service which establishes a user identity and/or password on the security system 20 corresponding to the consumer 14. Similarly, the second node 136 may invoke a web service for storing the user profile data 122 in the user profile system 24. The third node 138 may invoke a web service for creating a billing account corresponding to the user 14 on the billing system 22. A fourth node 140 may also be required to invoke a web service for informing the component providing the web service 16 that the consumer 14 is ready to access the web service 16. As noted previously, however, a comprehensive commercial web service system 10 may include other components which require provisioning, and which will result in additional corresponding nodes 132 in the provisioning process data 120.

As will be understood, one or more of the nodes 132 in a provisioning process may be interruptible. Such interruptible workflow steps may require decision-making or other human interaction by the service provider. For example, an interruptible workflow step or node 132 may be provided which allows the service provider to determine if the web service 16 for a particular user 14 will be operate on a fast server or a slower one, possibly based on the user's 14 anticipated requirements.

Figure 4:
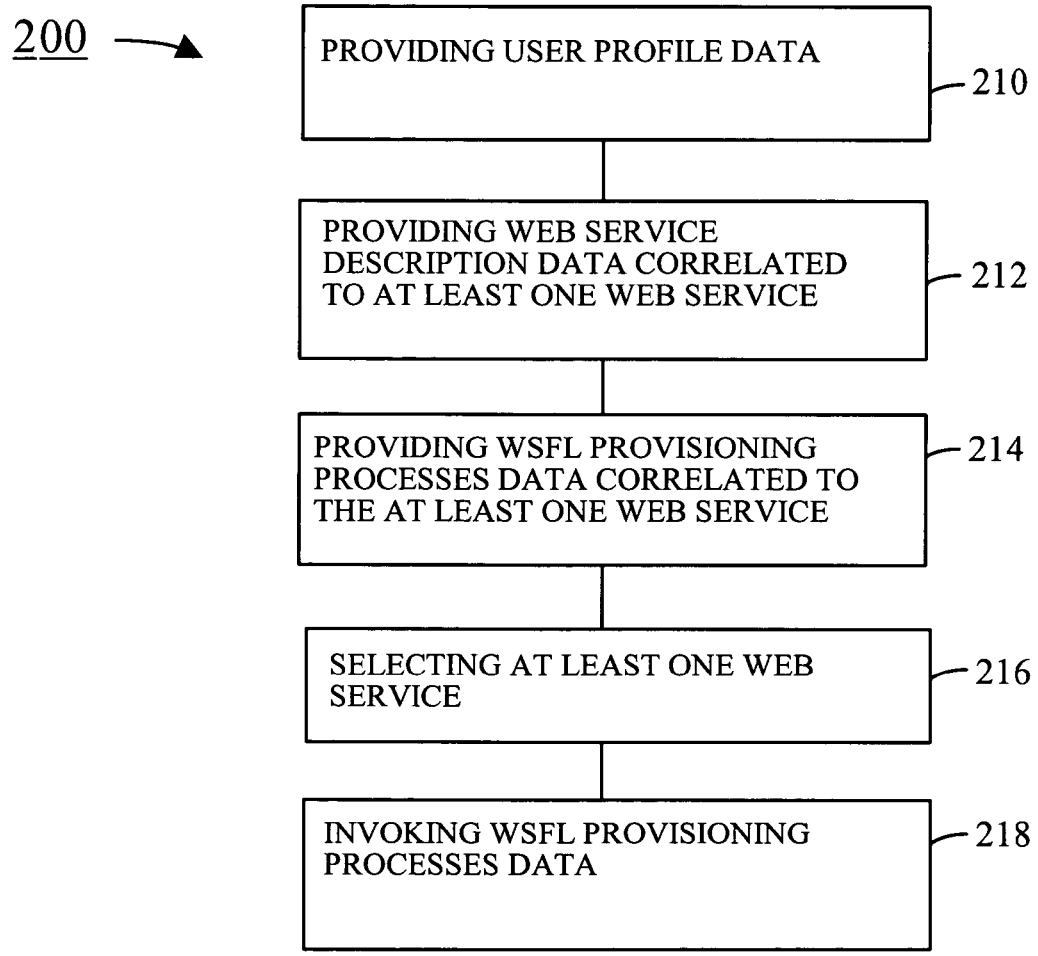
FIG. 4 is a flow diagram of the method of provisioning a web service in accordance with the present invention.

Referring now to FIG. 4, illustrated therein is a logical flow diagram summarizing the steps carried out in provisioning at least one web service in accordance with the method 200 of the present invention, described in greater detail, above. These steps include providing user profile data (Block 210), and providing web service description data correlated to the at least one web service (Block 212). The method 200 also includes the step of providing provisioning processes data correlated to the at least one web service (Block 214). Typically the provisioning processes data is in WSFL format. Finally, the method 200 includes the steps of selecting at least one web service (Block 216), and invoking the provisioning processes data correlated to the selected at least one web service (Block 218).

Figure 5:
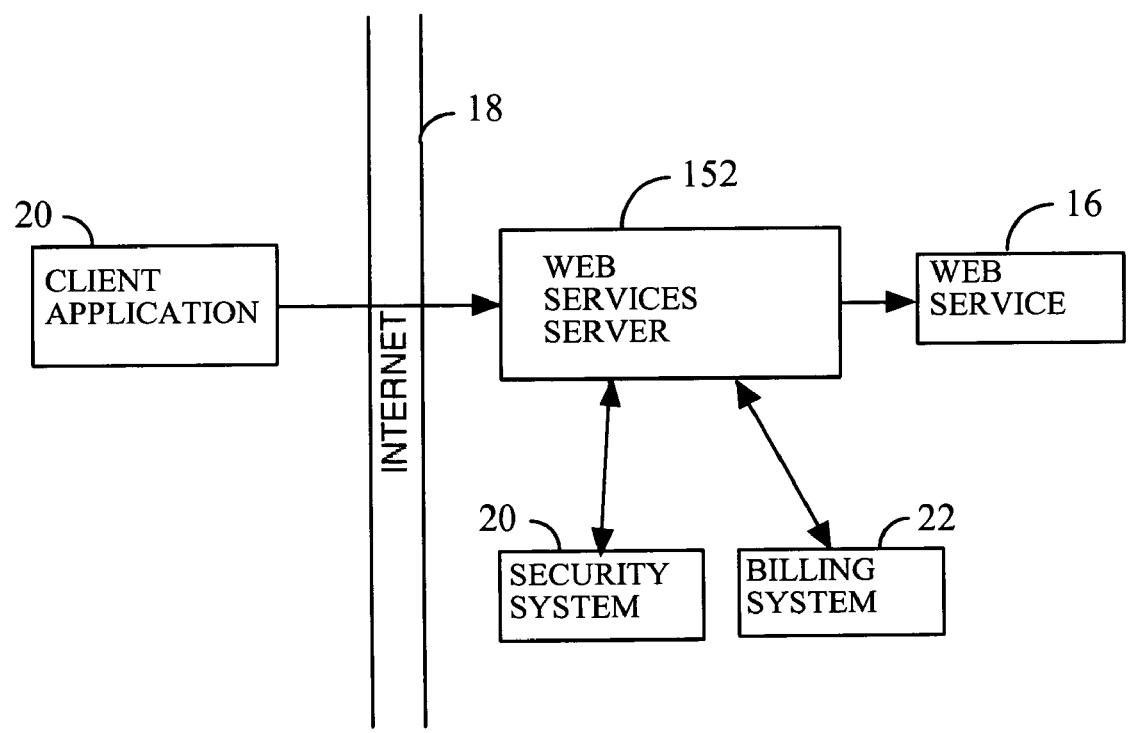
FIG. 5 is a schematic diagram of a provisioned web service.

FIG. 5 illustrates the process of invoking a web service once the various components have been provisioned by the web service provisioning system 100. When the user's 14 client application 150 requests invocation of the web service 16, the web services server 152 (and particularly the security system 20) will first verify the identity of the user 14. The user data provided by the client application 150 is compared to data stored by the security system 20 during the provisioning process. If the identity of the user 14 is valid, the billing system 22 will be informed of the invocation of the web service 16, in order to appropriately invoice the user's 14 account (also created during the provisioning process) for charges established for using the web service 16. Finally, the web service 16 itself will be invoked.

Thus, while what is shown and described herein constitutes preferred embodiments of the subject invention, it should be understood that various changes can be made without departing from the subject invention, the scope of which is defined in the appended claims.

The embodiments of the invention in which an exclusive property or privilege is claimed are defined as follows:

1. A web service provisioning system for provisioning a plurality of web services, the provisioning system comprising:
    a subscription system including:
        web service description data storage for storing web service description data correlated to each web service of the plurality of web services, wherein the web service description data defines the respective web service in Web Services Definition Language, and
        provisioning processes data storage for storing respective provisioning processes data for each web service of the plurality of web services and for each of a plurality of provisioning web services that correlate to respective administrative systems supporting the plurality of web services, wherein the provisioning processes data comprises a plurality of nodes, and wherein each node of the plurality of nodes comprises web service invocation data for invoking the respective provisioning web service, and wherein the provisioning processes data is in Web Services Flow Language; and
    an invocation system operatively coupled to the subscription system and configured for:
        receiving a selection of a first web service,
        invoking the respective provisioning processes data for the first web service, and
        invoking the respective provisioning processes data for each provisioning web service that correlates to an administrative system supporting the first web service.

2. The web service provisioning system as claimed in claim 1, further comprising a service catalog system configured to present the plurality of web services using the correlated web service description data and to allow selection of a desired web service.

3. The web service provisioning system as claimed in claim 2, wherein the service catalog system is further configured to determine user profile data.

4. The provisioning system of claim 1, wherein the plurality of provisioning web services for administering the plurality of web services correlate to administrative systems chosen from a group consisting of a billing system, a security system, and a user profile system.

5. A method of provisioning a plurality of web services, the method comprising:
    providing web service description data correlated to each web service of the plurality of web services, wherein the web service description data is in Web Services Definition Language;
    providing respective provisioning processes data for each web service of the plurality of web services and for each of a plurality of provisioning web services that correlate to respective administrative systems supporting the plurality of web services, wherein the provisioning processes data comprises a plurality of nodes, and wherein each node comprises web service invocation data correlated to invoking a respective provisioning web service, and wherein the provisioning processes data is in Web Services Flow Language;
    receiving a selection of a first web service;
    invoking the respective provisioning processes data for the first web service; and
    invoking the respective provisioning processes data for each provisioning web service that correlates to a respective administrative system supporting the first web service.

6. The method of claim 5, wherein the plurality of provisioning web services for administering the plurality of web services correlate to administrative systems chosen from a group consisting of a billing system, a security system, and a user profile system.

* * * * *